(12) United States Patent
Krampotich et al.

(10) Patent No.: US 7,876,993 B2
(45) Date of Patent: Jan. 25, 2011

(54) DRAWER ARRANGEMENT WITH RACK AND PINION

(75) Inventors: Dennis Krampotich, Shakopee, MN (US); Ryan Kostecka, Burnsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 35 days.

(21) Appl. No.: 12/381,161

(22) Filed: Mar. 6, 2009

(65) Prior Publication Data
US 2009/0274430 A1    Nov. 5, 2009

Related U.S. Application Data (60) Provisional application No. 61/126,671, filed on May 5, 2008.

(51) Int. Cl.
*G02B 6/00* (2006.01)
*A47F 3/14* (2006.01)

(52) U.S. Cl. .................................. 385/135; 211/126.15
(58) Field of Classification Search .................. None
See application file for complete search history.

(56) References Cited

U.S. PATENT DOCUMENTS

| 5,497,444 | A | 3/1996 | Wheeler |
|---|---|---|---|
| 6,438,310 | B1 | 8/2002 | Lance et al. |
| 6,504,988 | B1 | 1/2003 | Trebesch et al. |
| 6,809,258 | B1 | 10/2004 | Dang et al. |
| 7,079,744 | B2 | 7/2006 | Douglas et al. |
| 7,171,099 | B2 | 1/2007 | Barnes et al. |
| 2007/0031099 | A1 | 2/2007 | Herzog et al. |
| 2007/0201806 | A1 | 8/2007 | Douglas et al. |

OTHER PUBLICATIONS

U.S. Appl. No. 12/381,159, filed Mar. 6, 2009; Krampotich et al.
U.S. Appl. No. 12/381,160, filed Mar. 6, 2009; Krampotich et al.
U.S. Appl. No. 12/381,162, filed Mar. 6, 2009; Krampotich et al.
U.S. Appl. No. 61/072,148, filed Mar. 28, 2008; Krampotich; 19 pages.
U.S. Appl. No. 61/072,184, filed Mar. 28, 2008; Krampotich; 29 pages.
U.S. Appl. No. 61/072,186, filed Mar. 28, 2008; Krampotich; 38 pages.
U.S. Appl. No. 61/126,672, filed May 5, 2008; Krampotich; 33 pages.

*Primary Examiner*—Omar Rojas
(74) *Attorney, Agent, or Firm*—Merchant & Gould P.C.

(57) ABSTRACT

A cable management panel including chassis, a sliding drawer, and a rack and pinion arrangement. The rack and pinion arrangement including a first length of track located on an interior surface of the chassis, a second length of track provided on a drawer slide, and a gear that engages both the first track and the second track to control the movement of a sliding radius limiter mounted to the drawer.

41 Claims, 7 Drawing Sheets

DRAWER ARRANGEMENT WITH RACK AND PINION

CROSS-REFERENCE TO RELATED APPLICATIONS

This application claims the benefit of U.S. Provisional Application Ser. No. 61/126,671, filed May 5, 2008; which application is incorporated herein by reference.

FIELD OF TECHNOLOGY

The present disclosure relates to devices used in the telecommunications industry for managing fiber optic cables. In particular, the present disclosure relates to cable management panels used to store and/or provide cable terminations of fiber optic cables.

BACKGROUND

Cable management arrangements for cable termination, splice, and storage come in many forms. One cable management arrangement used in the telecommunications industry today includes sliding drawers installed on telecommunication equipment racks. The drawers provide organized, high-density, cable termination, splice, and storage in telecommunication infrastructures that often have limited space.

Access to the interior of such drawers is needed for purposes of installation, maintenance, and repairs, for example. When sliding a drawer from a closed position to an open position, unnecessary or excessive bending of the fiber optic cables is undesirable. Bending of the cables and optical fibers can cause attenuation, loss of signal strength, and breakage. There is a continued need in the art for better cable management devices and arrangements to address concerns regarding reliability and ease of use of cable management arrangements.

SUMMARY

The present invention relates to a cable management panel having a chassis, a drawer, and an arrangement for controlling the movement of a radius limiter located at a side of the drawer. In one aspect, the arrangement for controlling the radius limiter movement is a rack and pinion arrangement including first and second tracks and a gear. In another aspect, one of the tracks is formed on a slide that provides sliding movement between the drawer and the chassis. In yet another aspect, the first and second tracks have limited lengths that permit various sliding components of the panel to re-position or correction misalignments.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
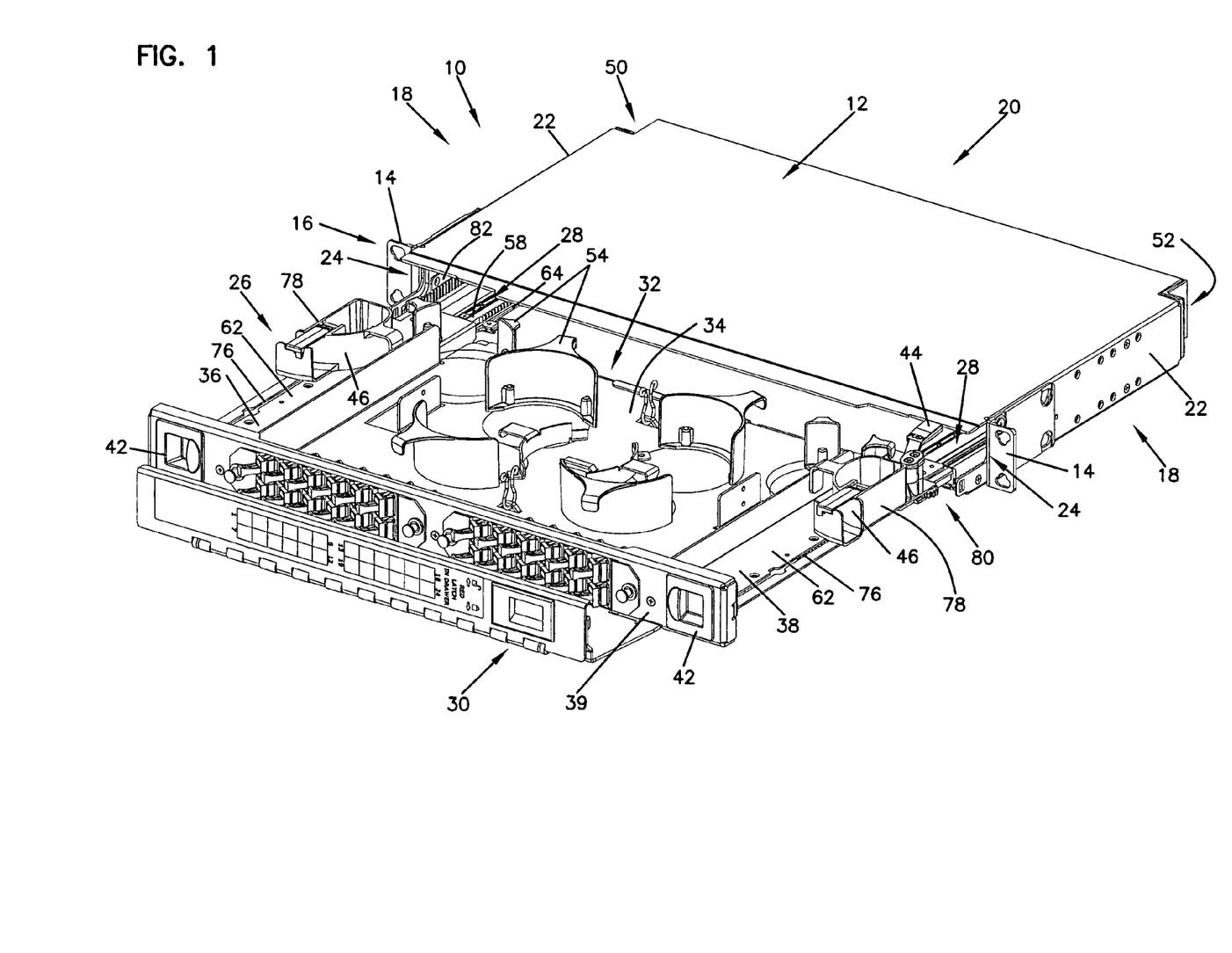
FIG. 1 is a front perspective view of a cable management panel including a rack and pinion arrangement according to the principles of the present disclosure.

Referring to FIG. 1, a cable management panel or module 10 according to the present invention is shown. The panel 10 includes a frame or chassis 12 having mounting brackets 14. Further details of an example mounting bracket that can be used in accordance with the principles disclosed are described in U.S. Pat. No. 7,171,099; the disclosure of which is incorporated herein by reference. The mounting brackets 14 are used to mount the panel 10 to a telecommunications structure, such as a telecommunications rack, for example. The cable management panel 10 can also be configured for mounting within a cabinet, enclosure, or on other mounting fixtures or framework. While the presently disclosed panel embodiment is illustrated in a horizontal mounting orientation, the panel can also be mounted in a vertical orientation.

The chassis 12 of the cable management panel 10 generally has a front 16, opposite sides 18, and a rear 20. The sides 18 are defined by sidewalls 22 each having side cable access openings 24 for cables entering or exiting the chassis 12. A drawer 26 is slidably mounted to the chassis 12. As will be discussed in greater detail hereinafter, the drawer 26 slides relative to the chassis 12 between an open position and a closed position by way of two drawer slides 28.

Referring still to FIG. 1, the drawer 26 of the cable management panel 10 includes a front 30, a rear 32, a bottom or base 34, and sides 36, 38. The front 30 of the drawer 26 is defined by a face panel 39. Front latches 42 are provided at both sides of the drawer 26 in the face panel 39 for securing the drawer 26 in the closed position. A rear latch 44 is provided at the rear 32 of the drawer for securing the drawer 26 in the open position. Further details of an example rear latch arrangement that can be used in accordance with the principles disclosed are described in U.S. Provisional Application No. 61/072,148, filed Mar. 28, 2008, and U.S. application Ser. No. 12/381,159, filed Mar. 6, 2009; the disclosures of which are incorporated herein by reference.

The face panel 39 of the illustrated drawer defines openings sized for receipt of bulkhead adapter plates 48. Further details of an example bulkhead adapter plate that can be used are described in U.S. Provisional Application No. 61/072,186, filed Mar. 28, 2008, and U.S. application Ser. No. 12/381,162, filed Mar. 6, 2009; which applications are incorporated herein by reference.

The present cable management panel 10 accommodates a number of cable routing configurations. The cable routing configurations include cable routings through rear openings 50, 52 and cable routings through the side access openings 24 defined by the chassis 12. The present panel can further include a variety of cable management elements 54 (e.g., cable management structures and distribution components or devices, and including such structures, components or devices mounted to either a drop-in tray or the base 34 of the drawer). Examples of various cable routing configurations, cable management elements, and drop-in trays that can be incorporated into the present cable management panel 10 are described in U.S. Pat. Nos. 6,438,310; 6,504,988; 5,497,444; U.S. Publication No. 2007/0031099; U.S. Provisional Application No. 61/072,184, filed Mar. 28, 2008; U.S. Provisional Application No. 61/126,672, filed May 5, 2008, and U.S. application Ser. No. 12/381,160, filed Mar. 6, 2009; the disclosures of which are incorporated herein by reference.

Figure 2:
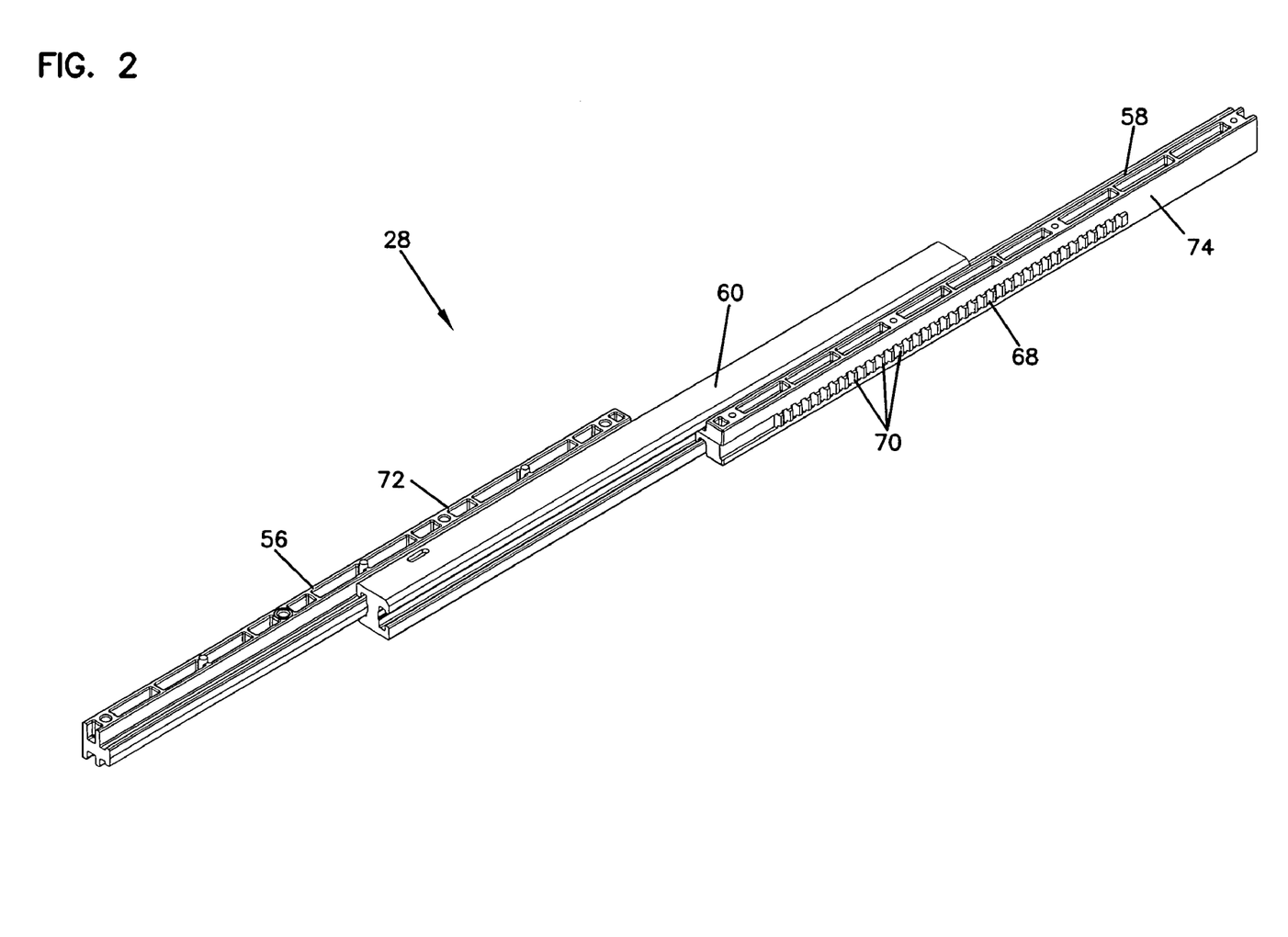
FIG. 2 is a perspective view of a drawer slide of the cable management panel of FIG. 1.
Figure 3:
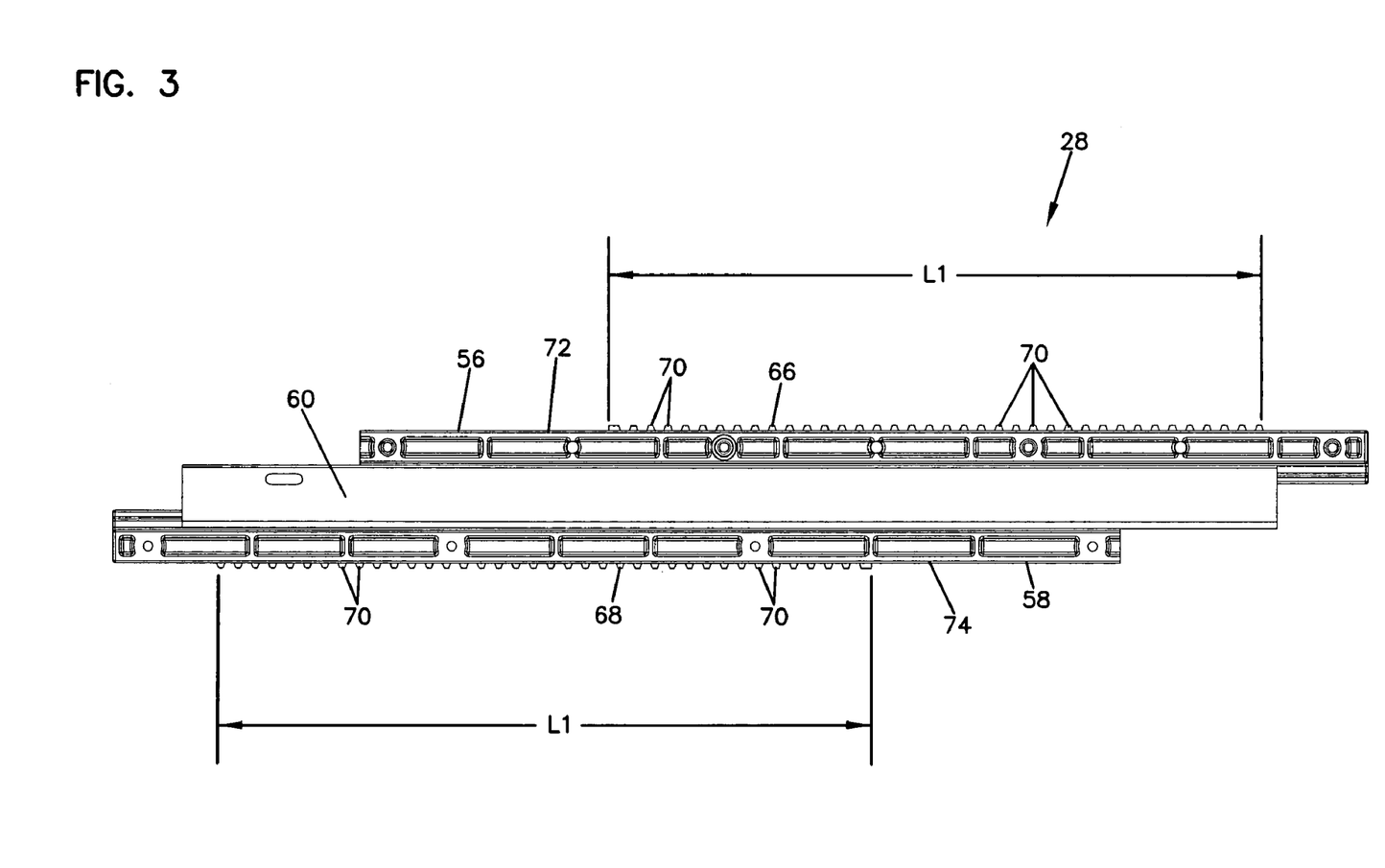
FIG. 3 is a top plan view of the drawer slide of FIG. 2.

Referring now to FIGS. 1-3, the present cable management panel 10 includes two drawer slides 28; each located at one of the sides 18 of the chassis 12. Each of the drawer slides 28 includes three slide rails including a first rail 56, a second rail 58, and a center rail 60. The first rail 56 is secured to the drawer 26 (i.e., to horizontal side plate 62 of the drawer 26; see FIGS. 1 and 5, for example), and the second rail 58 is secured to the chassis 12 (i.e., to a bottom 64 of the chassis; see FIGS. 1 and 4, for example). The center rail 60 interconnects the first rail 56 and the second rail 58. In operation, when the drawer 26 is moved relative to the chassis 12, the first rail 56 and the center rail 60 slide relative to the second rail 58. Further details of a similar slide assembly having a three-rail construction are described in U.S. Pat. No. 7,171,099; which disclosure is incorporated herein by reference. Referring to FIGS. 2 and 3, in the present cable management panel 10, the first rail 56 of the drawer slide 28 includes a first linear track 66 having protrusions or teeth 70 formed in an outer side portion 72 of the rail 56. Likewise, the second rail 58 of the drawer slide 28 includes a second linear track 68 having protrusions or teeth 70 formed in an outer side portion 74 of the rail 58.

Referring back to FIG. 1, the horizontal side plates 62 to which the first rails 56 of the drawer slides 28 attach each define longitudinal slots 76. The longitudinal slots 76 cooperate with radius limiters 78 located on each side 36, 38 of drawer 26. The radius limiters 78 each have a curved construction 46 that prevents cable exiting or entering the drawer at the sides from bending beyond a minimum bend radius. Further details of example radius limiter constructions that can be used in the present cable management panel are described in U.S. Pat. Nos. 6,438,310; 6,504,988; and 7,079,744; the disclosures of which are incorporated herein by reference. The slots 76 permit the radius limiters 78 to move relative to the drawer 26.

In use, the drawer slides 28 facilitate the sliding movement of the drawer relative to the chassis, and further facilitate movement of the radius limiters 78 relative to the sliding movement of the drawer 26. In the illustrated embodiment, the movement of the radius limiters 78 is synchronized; that is, the speed of movement of the radius limiters 78 is related to the speed of movement of the drawer 26. The synchronized movement of the radius limiters 78 accommodates for cable slack and ensures that cables stored within the interior of the drawer 26 do not bend too sharply when the drawer 26 is opened or closed. If the cables were to bend too sharply, loss of signal strength or loss of transmission may occur.

In the present cable management panel 10, the synchronized movement of the radius limiters 78 is controlled by a rack and pinion arrangement 80. The rack and pinion arrangement 80 generally includes a control arm 130 (FIG. 5), one of the first and second linear tracks 66, 68 of the slide 28, and a track plate 82 (see FIGS. 4 and 6).

Figure 5:
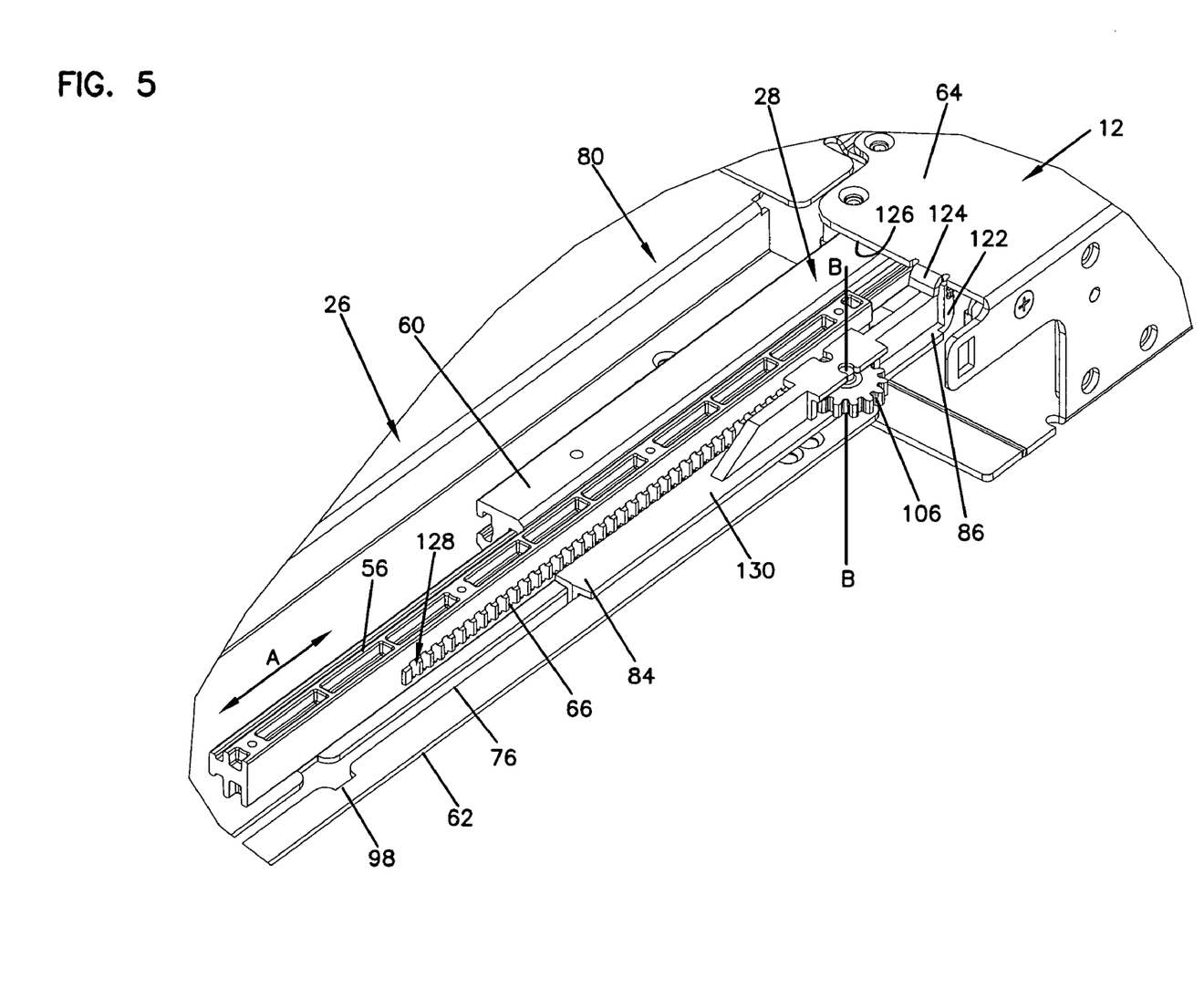
FIG. 5 is an enlarged, bottom perspective view of a portion of the cable management panel of FIG. 1, illustrated without a radius limiter and rear latch for purposes of showing the rack and pinion arrangement.
Figure 6:
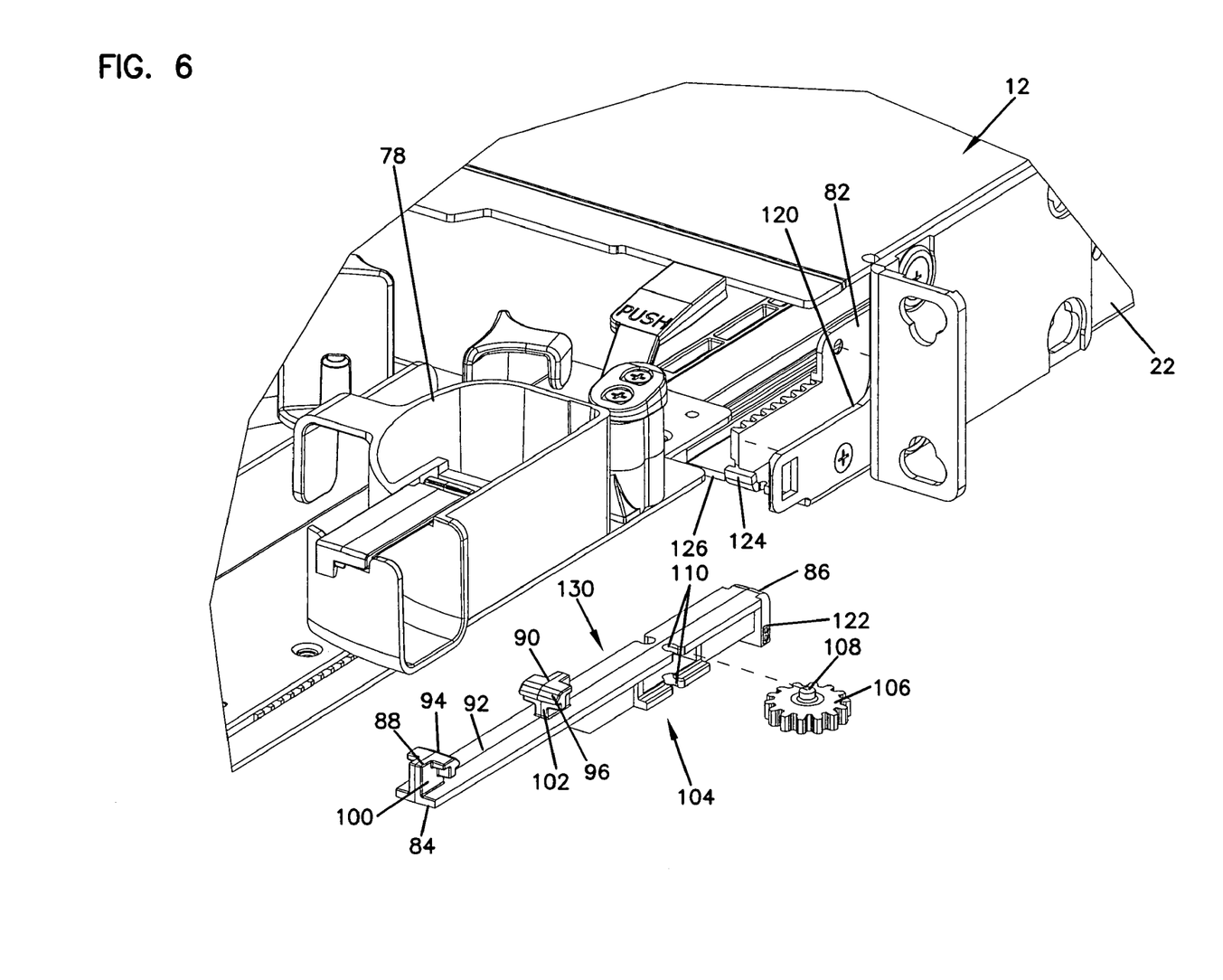
FIG. 6 is an enlarged perspective view of a portion of the cable management panel of FIG. 1, illustrated with the rack and pinion arrangement partly exploded.

Referring now to FIGS. 5 and 6, the control arm 130 of the rack and pinion arrangement 80 has a first end 84 and a second end 86. A first mounting projection 88 (FIG. 6) is located adjacent to the first end 84, and a second mounting projection 90 is located between the first mounting projection 88 and the second end 86. Each of the projections 88, 90 projects outward from a top surface 92 of the control arm 130. The projections 88, 90 each have a transverse head portion 94, 96 that fits within an opening 98 (FIG. 5) formed in the horizontal side plates 62 of the drawer 26. Neck portions 100, 102 of the projections 88, 90 are sized to slide within the longitudinal slots 76 of the side plates 62.

Figure 7:
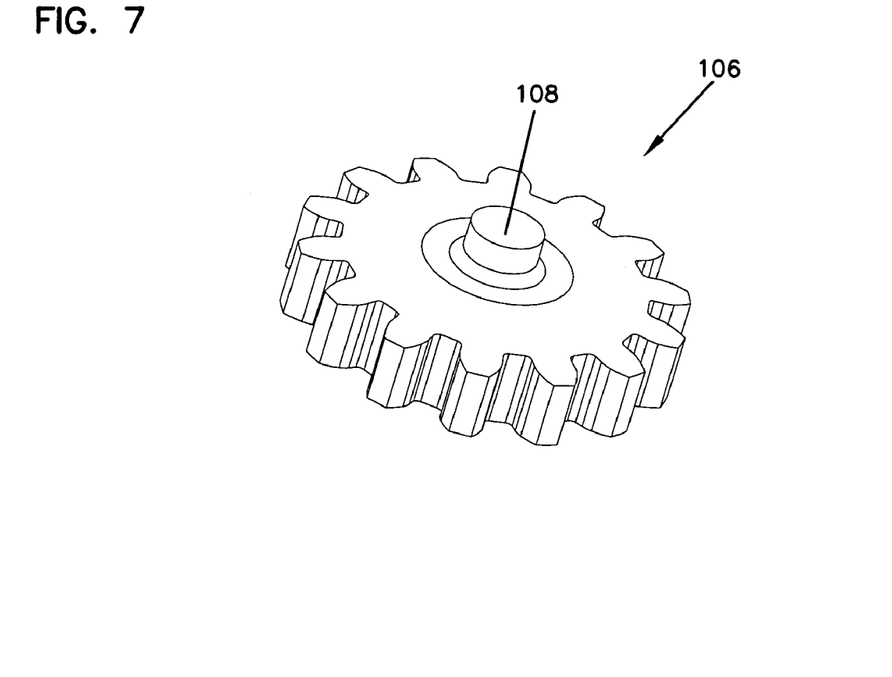
FIG. 7 is a perspective view of a gear of the rack and pinion arrangement of FIG. 6, shown in isolation.

The control arm 130 further has mounting structure 104 constructed to receive a toothed gear 106 of the rack and pinion arrangement 80. Referring to FIGS. 6 and 7, the gear 106 includes stub axels 108 (only one shown). The stub axels 108 are secured within slots 110 of the mounting structure 104 by a snap-fit connection. In the illustrated embodiment, the control arm 130 is configured to selectively mount to the drawer at either the left side 36 or the right side 38. What is meant by "selectively" mount is that the control arm is mountable and operable at both sides 36, 38 of the drawer, and the user may choose at which side the control arm is to be mounted. For example, the mounting structure 104 includes slots 110 on both sides of the control arm 130 for receipt of the gear in a left-side mounting application (shown in FIG. 6) and for receipt of the gear in a right-side mounting application. During use, the stub axels 108 of the gear 106 rotate within the slots 110 of the control arm 130.

Figure 8:
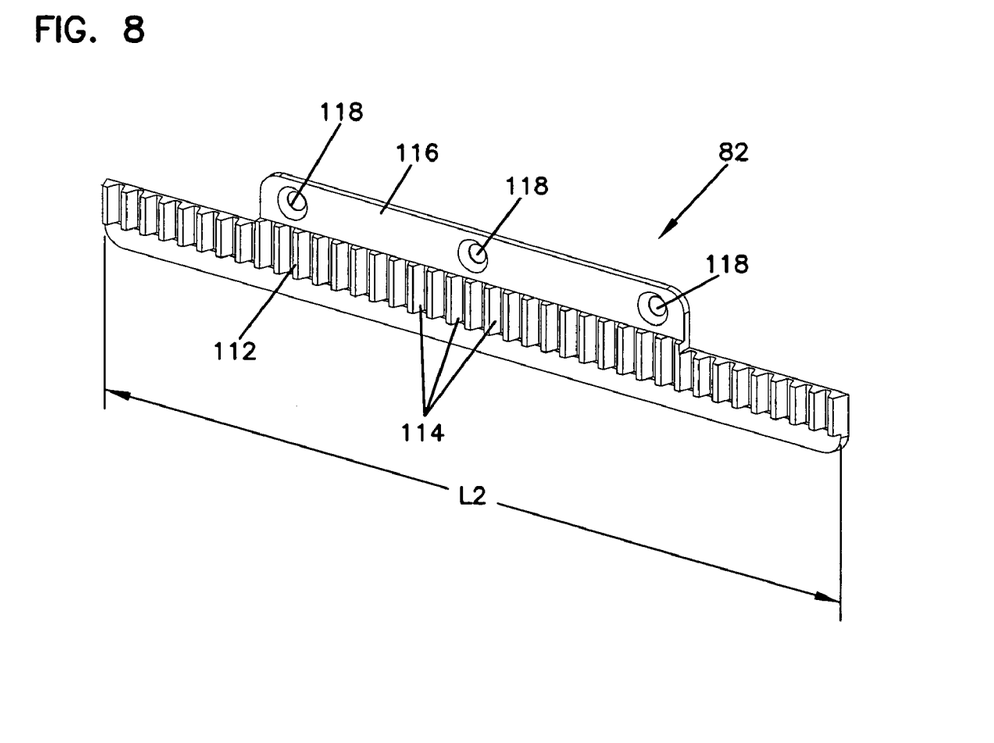
FIG. 8 is a perspective view of a track of the rack and pinion arrangement of FIG. 6, shown in isolation.

Referring now to FIGS. 6 and 8, the track plate 82 of the rack and pinion arrangement 80 includes a linear track 112 having protrusions or teeth 114. The track plate 82 includes a mounting tab 116 that defines mounting holes 118. The mounting holes 118 receive fasteners (not shown) that secure the track plate 82 to an inner surface 120 of the chassis 12 (see also FIG. 1). The inner surface 120 can be defined by either the sidewall 22 of the chassis 12, or by a secondary plate or component located within the interior of the chassis 12.

Figure 4:
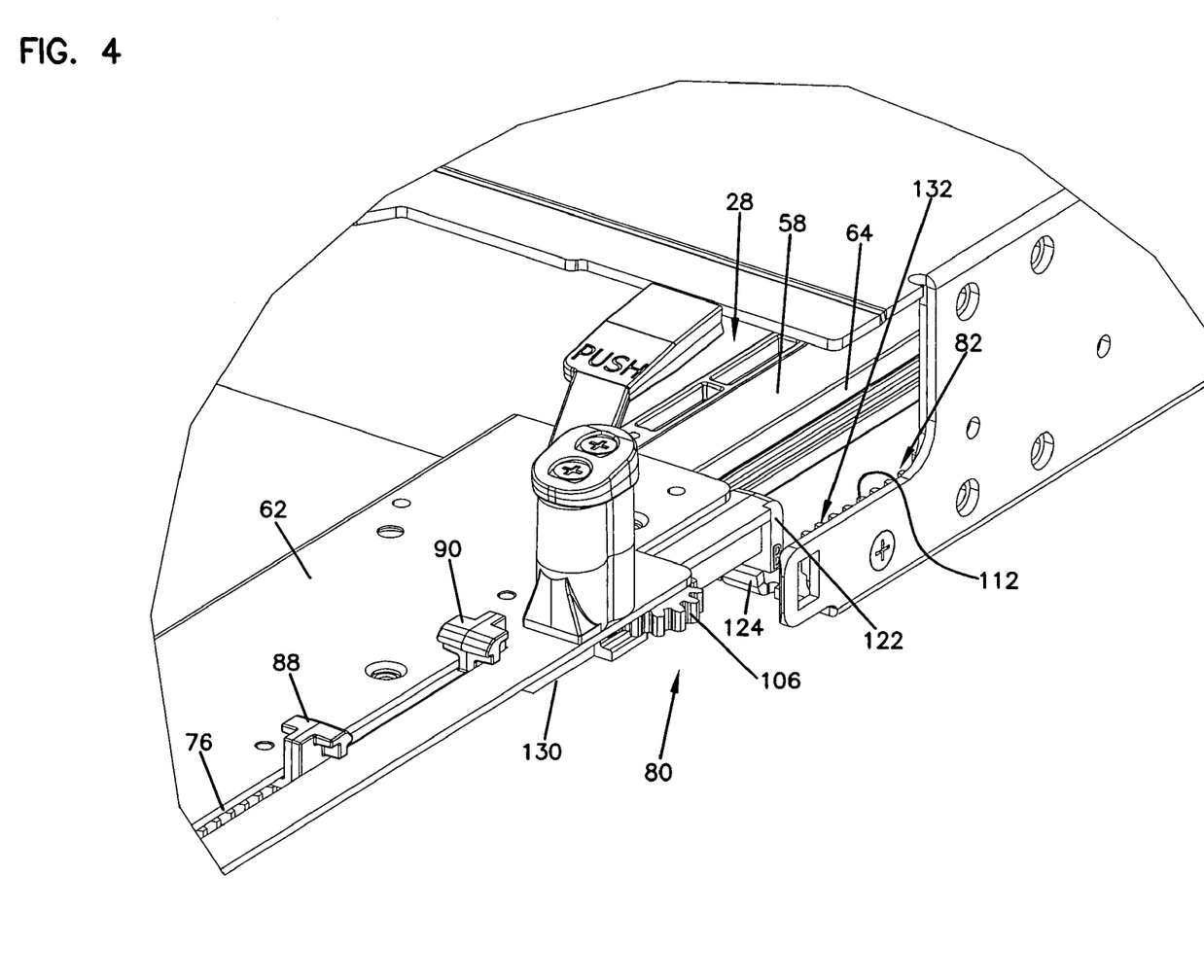
FIG. 4 is an enlarged, top perspective view of a portion of the cable management panel of FIG. 1, illustrated without a radius limiter for purposes of showing the rack and pinion arrangement.

Referring to FIGS. 1 and 4, the radius limiter 78 (FIG. 1) secures to the first and second projections 88, 90 (FIG. 4) of the control arm 130 extending through the slot 76 of the drawer 26. The gear 106 of the rack and pinion arrangement 80 is configured to provide half speed linear movement by rotational contact with both the track (e.g., 66) of the slide 28 and the track 112 of the track plate 82. That is, when the drawer 26 slides relative to the chassis 12, the gear 106 engages with the teeth 70, 114, of the tracks 66, 112 and rotates to permit the control arm 130 to travel at half speed (while the first rail 56 travels at full speed). The radius limiter 78 attached to the projections 88, 90 of the control arm 130 thereby travel at half speed relative to the speed of the drawer 26. A different relative speed can be achieved by using a different sized gear. Referring to FIG. 5, the gear 106 is configured to rotate about a vertical axis of rotation B that is perpendicular to the direction A of sliding movement of the drawer 26.

Referring again to FIGS. 4 and 5, the control arm 130 of the present rack and pinion arrangement 80 further functions as a drawer stop that prevents the drawer from becoming separated from the chassis 12. In particular, the second end 86 of the control arm includes a tab 122. The tab 122 contacts a stop 124 formed in an edge 126 of the bottom 64 of the chassis 12. The tab 122 contacts the stop 124 when the drawer is pulled out beyond the fully-open position.

During installation and use, the cable management panel can under go rough handling or excessive loading that can cause a misalignment between one or both of the slides and the position of the drawer (e.g., the slide rails becomes misaligned such that the drawer won't fully close or open). In such a situation, the relative positions of the rails 56, 58, 60 of the drawer slide 28 can be re-adjusted by fully extending the drawer 26 or fully closing the drawer, without any disassembly of the panel. For example, excessive loading can cause the first rail 56 and the center rail 60 to become misaligned. When this non-closing drawer 26 is pushed toward the fully closed position, the center rail 60 and the second rail 58 remain stationary; as the user continues to push the non-closing drawer, the first rail 56 slides relative to the stationary center rail 60 to correct any mismatch of the relative positioning of the rails 56, 60. As can be understood, the same re-adjustment can be made if the center rail 60 becomes mismatched with the second rail 58 affixed to the chassis. Likewise, when the drawer 26 is extended beyond the fully-open position, and just prior to the point where the drawer stop prevents drawer separation, the rails 56, 58, 60 may slide to an extended position to correct any mismatch of the relative positioning of the rails.

The rough handling or excessive loading can also cause a misalignment between the radius limiter and the position of the drawer (e.g., the radius limiter does not move fully forward or rearward in the longitudinal slot as intended). In such a situation, the relative positions of the drawer 26 and the radius limiter 78 can be re-adjusted by fully extending the drawer, or fully closing the drawer, without any disassembly of the panel.

The rack and pinion arrangement 80 of the present disclosure has been designed to account for the above misalignments or mismatches due to rough handling or excessive loading. When the gear 106 of the rack and pinion arrangement 80 is engaged with both the track 66 of the slide 28 and the track 112 of the track plate 82, the rails of the slide 28 cannot slide to correct any mismatch or misalignment. Accordingly, the tracks have been particularly designed with a length L1, L2 (FIGS. 3 and 8) that allow the gear to disengage from one of the tracks 66, 112 to accommodate all the above described alignment corrections.

In particular, when the drawer is fully closed, the gear 106 disengages from the forward end 128 (FIG. 5) of the track 66 of the slide 28. This disengagement in the closed position allows the rails 56, 58, 60 of the slide 28 to re-adjust or correct their relative positions as previously described. This disengagement in the closed position also allows the radius limiter 78 to re-position itself within the longitudinal slot 76 of the drawer 26.

Likewise, when the drawer 26 is fully opened, the gear 106 disengages from the forward end 132 (FIG. 4) of the track 112 of the track plate 82. This disengagement in the open position allows the rails 56, 58, 60 of the slide 28 to re-adjust or correct their relative positions. This disengagement in the open position also allows the radius limiter 78 to re-position itself within the longitudinal slot of the drawer 26.

In addition, the present rack and pinion arrangement 80 includes only a single gear. The single gear 106 accommodates the above disengagement in both the drawer-open position and the drawer-closed position.

While the above description relates primarily to the rack and pinion arrangement 80 located at the left side of the present cable management panel 10, it is to be understood that the same rack and pinion arrangement is located at the right side of the panel to control the movement of the radius limiter at the right side. Furthermore, the present rack and pinion arrangement 40 can be selectively mounted adjacent to either one of the open sides 36, 38 of the drawer. As previously described, what is meant by "selectively" mounted is that the arrangement 40 is mountable and operable at both sides 36, 38 of the drawer. For example, the track plate 82 of FIG. 8 is constructed to selectively mount adjacent to or at either the left sidewall 22 (FIG. 1) or the right sidewall (FIG. 6) of the chassis 12. Likewise, the slide 28 of FIG. 2 is constructed to selectively mount adjacent to or at the left open side 36 or the right open side 38 of the drawer. Also as previously described, the gear mounts to the control arm at one of a leftward mounting location and a rightward mounting location, and the control arm is constructed to selectively mount to the left open side 36 or the right open side 38 of the drawer. This universal construction reduces manufacturing costs by eliminating the need to manufacture different left side components and right side components.

The above specification provides a complete description of the present invention. Since many embodiments of the invention can be made without departing from the spirit and scope of the invention, certain aspects of the invention reside in the claims hereinafter appended.

What is claimed is:

1. A cable management panel, comprising:
   a) a chassis having a top wall, opposite side walls, and a rear wall, the side walls and the rear wall defining side and rear cable access openings;
   b) a drawer mounted to the chassis, the drawer being configured to slide between an open position and a closed position relative to the chassis, the drawer including a base defining open sides;
   c) a slide that allows the drawer to slide between the open position and the closed position;
   d) a sliding radius limiter located at one of the open sides of the drawer; and
   e) a rack and pinion arrangement, including:
      i) a first length of track located adjacent to one of the side walls of the chassis;
      ii) a second length of track provided on the slide;
      iii) a gear that engages both the first length of track and the second length of track to control the movement of the sliding radius limiter; and
      iv) a control arm including a projection to which the sliding radius limiter is attached and mounting structure to which the gear is mounted.

2. The panel of claim 1, wherein the gear can mount to the control arm at a leftward mounting location and can also mount to the control arm at a rightward mounting location, and wherein the control arm is selectively mounted at one of the open sides of the drawer.

3. The panel of claim 1, wherein the gear is mounted to the control arm such that an axis of rotation of the gear is vertical.

4. The panel of claim 1, wherein the control arm includes a stop tab that engages the chassis to prevent the drawer from separating from the chassis when the drawer slides beyond the open position.

5. The panel of claim 4, wherein the stop tab of the control arm engages a tab formed in an edge of a bottom portion of the chassis.

6. The panel of claim 1, wherein the gear disengages from one of the first length of track and the second length of track when the drawer is in the closed position.

7. The panel of claim 1, wherein the gear disengages from one of the first length of track and the second length of track when the drawer is in the open position.

8. The panel of claim 1, wherein the slide includes a plurality of rails that slide relative to one another, the plurality of rails including a first rail attached to the drawer, a second rail attached to the chassis, and a third rail interconnected between the first rail and the second rail.

9. The panel of claim 8, wherein the relative positions of the rails of the slide can be re-adjust without disassembly of the cable management panel, the re-adjustment being facilitated by the gear disengaging from one of the first length of track and the second length of track when the drawer is in the closed position, and by the gear disengaging from the other of the first length of track and the second length of track when the drawer is in the open position.

10. The panel of claim 8, wherein the relative positions of the drawer and the radius limiter can be re-adjust without disassembly of the cable management panel, the re-adjustment being facilitated by the gear disengaging from one of the first length of track and the second length of track when the drawer is in the closed position, and by the gear disengaging from the other of the first length of track and the second length of track when the drawer is in the open position.

11. The panel of claim 1, wherein the rack and pinion arrangement has only a single gear.

12. The panel of claim 1, wherein the first length of track is formed on a plate that mounts to an inner surface of the chassis.

13. The panel of claim 12, wherein the rack and pinion arrangement is selectively mounted adjacent to one of the open sides of the drawer, such that the plate with the first length of track is selectively mounted adjacent to one of the opposite side walls of the chassis, and such that the slide with the second length of track is selectively located at the one of the open sides of the drawer.

14. A cable management panel, comprising:
  a) a chassis having a top wall, opposite side walls, and a rear wall, the side walls and the rear wall defining side and rear cable access openings;
  b) a drawer mounted to the chassis, the drawer being configured to slide between an open position and a closed position relative to the chassis, the drawer including a base defining open sides;
  c) a sliding radius limiter located at one of the open sides of the drawer; and
  d) a rack and pinion arrangement, including:
    i) a first length of track;
    ii) a second length of track;
    iii) a control arm including a projection that projects above the one open side of the drawer, the sliding radius limiter being attached to the projection; and
    iv) a single gear carried by the control arm, the gear engaging both the first length of track and the second length of track during sliding movement of the drawer to control the relative movement of the sliding radius limiter.

15. The panel of claim 14, further including a slide that facilitates the sliding movement of the drawer relative to the chassis, wherein one of the first and second lengths of track is provided on the slide.

16. The panel of claim 15, wherein the slide includes a plurality of rails that slide relative to one another, the plurality of rails including a first rail attached to the drawer, a second rail attached to the chassis, and a third rail interconnected between the first rail and the second rail.

17. The panel of claim 16, wherein the relative positions of the rails of the slide can be re-adjust without disassembly of the cable management panel, the re-adjustment being facilitated by the gear disengaging from one of the first length of track and the second length of track when the drawer is in the closed position, and by the gear disengaging from the other of the first length of track and the second length of track when the drawer is in the open position.

18. The panel of claim 14, wherein the relative positions of the drawer and the radius limiter can be re-adjust without disassembly of the cable management panel, the re-adjustment being facilitated by the gear disengaging from one of the first length of track and the second length of track when the drawer is in the closed position, and by the gear disengaging from the other of the first length of track and the second length of track when the drawer is in the open position.

19. The panel of claim 14, wherein the gear can be carried by the control arm at a leftward location and can also be carried by the control arm at a rightward location, and wherein the control arm is selectively mounted at one of the open sides of the drawer.

20. The panel of claim 14, wherein the gear is carried by the control arm such that an axis of rotation of the gear is vertical.

21. The panel of claim 14, wherein the control arm includes a stop tab that engages the chassis to prevent the drawer from separating from the chassis when the drawer slides beyond the open position.

22. The panel of claim 21, wherein the stop tab of the control arm engages a tab formed in an edge of a bottom portion of the chassis.

23. The panel of claim 14, wherein the gear disengages from one of the first length of track and the second length of track when the drawer is in the closed position.

24. The panel of claim 14, wherein the gear disengages from one of the first length of track and the second length of track when the drawer is in the open position.

25. The panel of claim 14, wherein one of the first and second lengths of track is located adjacent to one of the side walls of the chassis.

26. The panel of claim 25, wherein the one of the first and second lengths of track is formed on a plate that mounts to an inner surface of the chassis.

27. The panel of claim 14, wherein the rack and pinion arrangement is selectively mounted adjacent to one of the open sides of the drawer.

28. A cable management panel, comprising:
  a) a chassis;
  b) a drawer slidably mounted to the chassis;
  c) a sliding radius limiter located adjacent to a side of the drawer; and
  d) a rack and pinion arrangement, including:
    i) a first length of track;
    ii) a second length of track;
    iii) a gear that engages both the first length of track and the second length of track during sliding movement of the drawer to control the relative movement of the sliding radius limiter; and
    iv) a control arm, the sliding radius limiter and the gear being mounted to the control arm.

29. The panel of claim 28, further including a slide that provides for sliding movement of the drawer relative to the chassis.

30. The panel of claim 29, wherein the slide includes a plurality of rails that slide relative to one another, the plurality of rails including a first rail attached to the drawer, a second rail attached to the chassis, and a third rail interconnected between the first rail and the second rail.

31. The panel of claim 30, wherein the relative positions of the rails of the slide can be re-adjust without disassembly of the cable management panel, the re-adjustment being facilitated by the gear disengaging from one of the first length of track and the second length of track when the drawer is in a closed position, and by the gear disengaging from the other of the first length of track and the second length of track when the drawer is in an open position.

32. The panel of claim 3, wherein the relative positions of the drawer and the radius limiter can be re-adjust without disassembly of the cable management panel, the re-adjustment being facilitated by the gear disengaging from one of the first length of track and the second length of track when the drawer is in a closed position, and by the gear disengaging from the other of the first length of track and the second length of track when the drawer is in an open position.

33. The panel of claim 28, wherein the control arm includes a projection to which the sliding radius limiter is mounted.

34. The panel of claim 28, wherein the gear can mount to the control arm at a leftward mounting location and can also mount to the control arm at a rightward mounting location, and wherein the control arm is selectively mounted at one of a left side and a right side of the drawer.

35. The panel of claim 28, wherein the gear is mounted to the control arm such that an axis of rotation of the gear is vertical.

36. The panel of claim 28, wherein the control arm includes a stop tab that engages the chassis to prevent the drawer from separating from the chassis when the drawer slides beyond an open position.

37. The panel of claim 36, wherein the stop tab of the control arm engages a tab formed in an edge of a bottom portion of the chassis.

38. The panel of claim 28, wherein the gear disengages from one of the first length of track and the second length of track when the drawer is in a closed position.

39. The panel of claim 28, wherein the gear disengages from one of the first length of track and the second length of track when the drawer is in an open position.

40. The panel of claim 28, wherein the rack and pinion arrangement has only a single gear.

41. The panel of claim 28, wherein the first length of track is formed on a plate that mounts to an inner surface of the chassis.

* * * * *